Jan. 6, 1948.  L. J. MARHOEFER  2,433,999
WING AND STABILIZER STRUCTURE FOR GLIDERS
Filed June 10, 1944  2 Sheets-Sheet 2
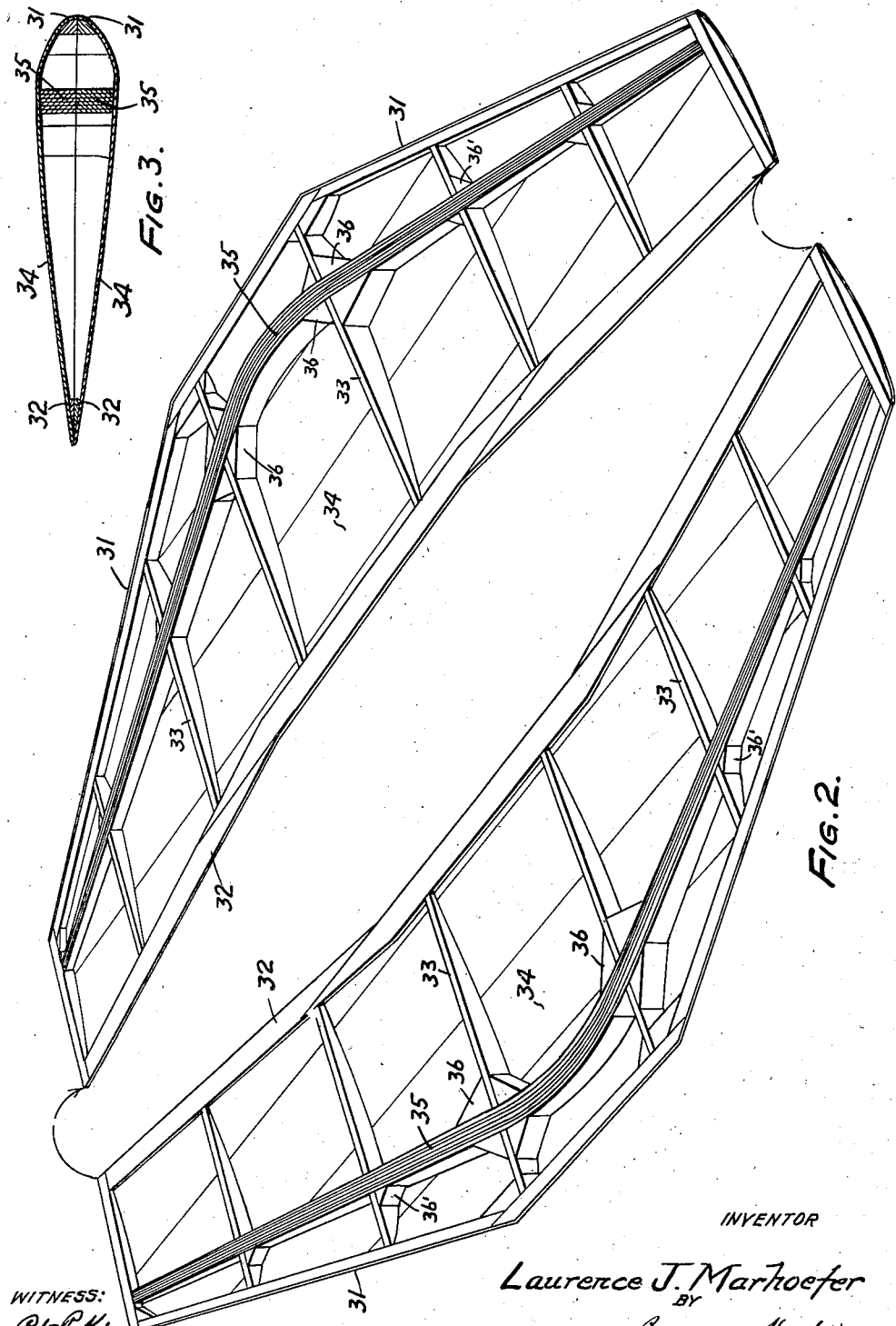
INVENTOR
Laurence J. Marhoefer
BY
Busser and Harding
ATTORNEYS.

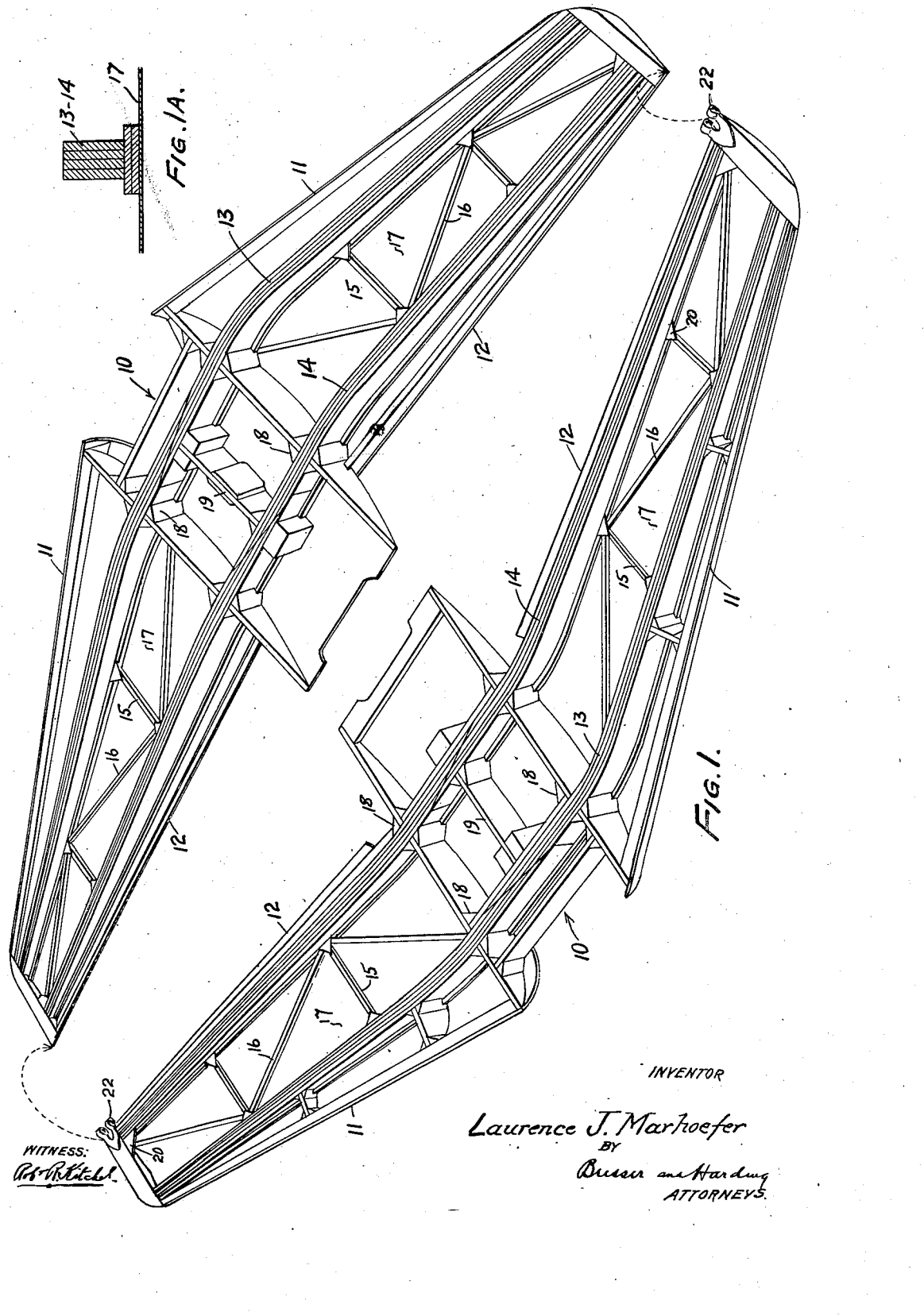

Patented Jan. 6, 1948

2,433,999

UNITED STATES PATENT OFFICE 2,433,999

WING AND STABILIZER STRUCTURE FOR GLIDERS

Laurence J. Marhoefer, Haddon Heights, N. J., assignor to Vidal Corporation, Camden, N. J., a corporation of Delaware Application June 10, 1944, Serial No. 539,725

5 Claims. (Cl. 244—124)

My invention relates to airplane wings and stabilizers, particularly adapted for use in the construction of bomb-carrying gliders.

The structural elements embodying the invention embody features and combinations of elements that are common to the construction of both the wing and the stabilizer, and the basic invention, therefore, may be said to embody the structural arrangement common to both. Preferred embodiments of the invention are shown in the drawings, wherein—

Fig. 1 is a perspective view of the top and bottom sections of a wing structure embodying my invention.

Fig. 1A is an enlarged detail section through one of the spars.

Fig. 2 is a perspective view of the top and bottom sections of a stabilizer embodying my invention.

Fig. 3 is a cross-section through the stabilizer after the sections thereof are secured together.

Referring first to the wing structure shown in Fig. 1:

The wing structure is made in two halves—upper and lower—each half comprising a central frame 10 and right and left wing sections. Each wing section comprises leading edge stringers 11, each extending from the central frame to an outer edge of the wing section, a forward spar 13, a rear spar 14, cross reinforcing bars 15, diagonal reinforcing bars 16 and a skin 17. The wing section may also be provided, in some constructions, with trailing edge stringers 12, each extending from the central frame to an outer end of the wing section.

The inner ends of the spars 13 (and of the spars 14) are secured together so as to form a continuous spar extending along and throughout the length of both wings and across the center frame. At their junction with the center frame, reinforcing blocks 18 are applied at the angles between the spars and the transverse ribs 21 of the central frame. Midway between the cross ribs 21 of the central frame the spars are connected by a midrib 19.

The molding of the wing elements into integral structures may be effected by means known in the art and, being no part of my invention, need not be described in detail. After each half wing is removed from the form, the blocks 18 and gussets 20 are secured in place by nailing or gluing. To the outer ends of the two sections of the lower half wing are applied aileron hinges 22. After the completion of each half section glue is spread on the matching surfaces and the two sections are pulled together by means of screws or bolts. The wing elements are thus assembled in one unit, continuous from tip to tip.

The wing structure is installed by bringing it into position over the fuselage. When the wing structure forms part of a glider it may be installed with the fuselage by bringing it into position thereover and by securing it in fixed relation thereto and to a bomb installed in the fuselage by means described and illustrated in applications Serial Nos. 539,723 and 539,724 (now Patent #2,407,563, issued September 10, 1946), filed of even date herewith. However, the means for connecting the wing structure with the fuselage forms no part of my invention and any known or suitable means may be employed.

The stabilizer, shown in Figs. 2 and 3, is also moulded in two halves. Like the wings, it comprises leading edge strips 31, trailing edge strips 32, cross reinforcing bars 33 and a skin 34. Instead of two spars extending throughout the length of he wing structure, there is a single spar 35 extending throughout the length of the stabilizer. At their junction with the two cross-bars nearest the center of the stabilizer, reinforcing blocks 36 are applied at the angles between the spar and the cross bars. Gussets 36' are applied at the angles between the spar and the other cross-bars.

After the completion of each half section of the stabilizer, the two sections may be secured together in the same way as that described for securing together the two wing sections and, when thus assembled in one unit, form a structure continuous from tip to tip.

The leading edge strip 31 and the trailing edge strip 32 are each preferably formed in three sections, namely, a central section and end sections, as shown.

What I claim and desire to protect by Letters Patent is:

1. A wing structure made in two halves, upper and lower, of like contour and construction, each half being a unitary structure comprising a half right wing, a half left wing and a central half frame; each half wing comprising a leading edge stringer and trailing edge stringer both secured at their inner ends to the corresponding central half frame, and spars, one near and inside the leading edge stringer and the other near and inside the trailing edge stringer; the spars of each half wing extending from substantially the outer edge of such half wing in alignment with and at their inner ends integrally united to the corresponding spars of the corresponding other half wing and being also secured to the corresponding half central frame, thereby providing front and rear spars extending throughout the length of the wing structure from the end of one half wing to the end of the other corresponding half wing, cross reinforcing bars extending between the spars, one of said half wing unitary structures being superposed on and united to the other half wing unitary structure to align and abut the leading and trailing edge stringers and the spars of each half wing structure with the corresponding elements of the other half wing structure.

2. A wing structure for gliders as defined in claim 1 in which each central half frame comprises two cross ribs extending respectively from the leading edges of the corresponding half wings to beyond their trailing edges, and ribs uniting said cross ribs, the spars of each half wing structure intersecting and secured to the cross ribs of the corresponding central half frame.

3. A wing structure for gliders as defined in claim 1 in which each central half frame comprises two cross ribs extending respectively from the leading edges of the corresponding half wings to beyond their trailing edges, and ribs uniting said cross ribs, the spars of each half wing structure intersecting and secured to the cross ribs of the corresponding central half frame, and a transverse reinforcing cross mid-rib at the center of each central half frame connecting the spars of such frame.

4. A wing structure or stabilizer made in two halves, upper and lower, of like contour and construction, each half being a unitary structure comprising right and left end sections and a central section; each end half section comprising a leading edge strip, a trailing edge strip and cross reinforcing bars, each central section also comprising cross reinforcing bars, a spar extending, inside and relatively near the leading edge stringers of the corresponding halves, from substantially the outer edge of one half section to substantially the outer edge of the other corresponding half section and engaging the cross reinforcing bars of corresponding end sections and the cross bars of the corresponding central half section, one of the halves being superposed on and united to the other half to align and abut the leading and trailing edge strips and the spars of one half section with the corresponding elements of the other half section.

5. A stabilizer for gliders as defined in claim 4 in which the central section of each half comprises two reinforcing cross ribs, a leading edge strip integrally united at opposite ends to inner ends of the leading edge strips of the corresponding end sections and a trailing edge stringer integrally united at opposite ends to the inner ends of the trailing edge strips of the corresponding end section.

LAURENCE J. MARHOEFER.

REFERENCES CITED

The following references are of record in the file of this patent:

UNITED STATES PATENTS

| Number | Name | Date |
|---|---|---|
| 1,352,600 | Haskell | Sept. 14, 1920 |
| 1,559,090 | Hall | Oct. 27, 1925 |
| 1,890,820 | Markey | Dec. 13, 1932 |
| 1,919,620 | Ganahl | July 25, 1933 |
| 2,125,882 | Berliner | Aug. 9, 1938 |
| 2,273,919 | Allward | Feb. 24, 1942 |

FOREIGN PATENTS

| Number | Country | Date |
|---|---|---|
| 315,793 | Great Britain | Aug. 21, 1930 |